Dec. 19, 1939.   W. N. BRAY   2,183,666
LASTING MACHINE
Filed March 7, 1939
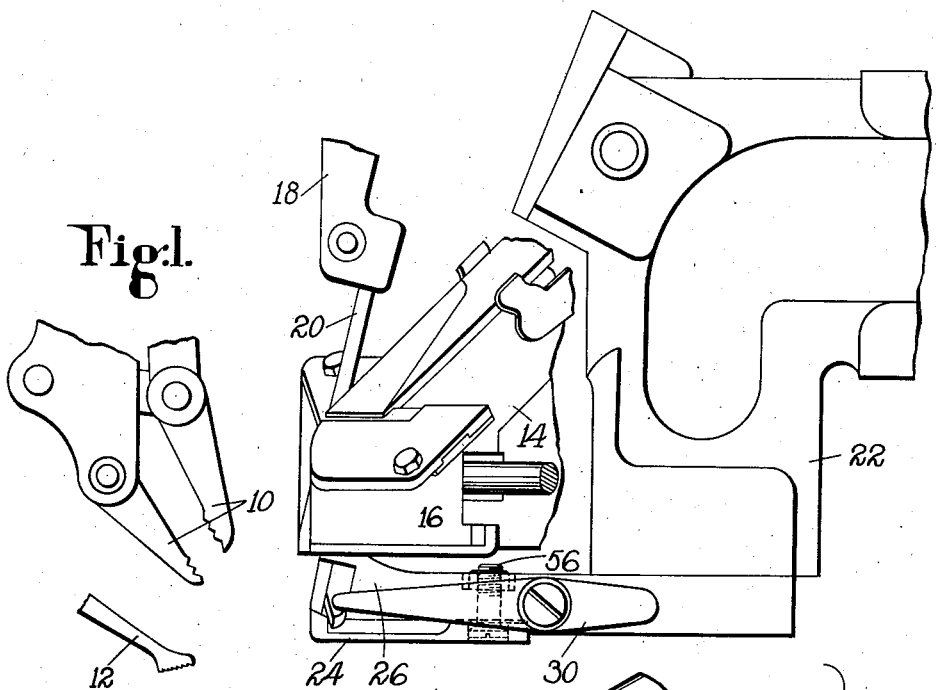
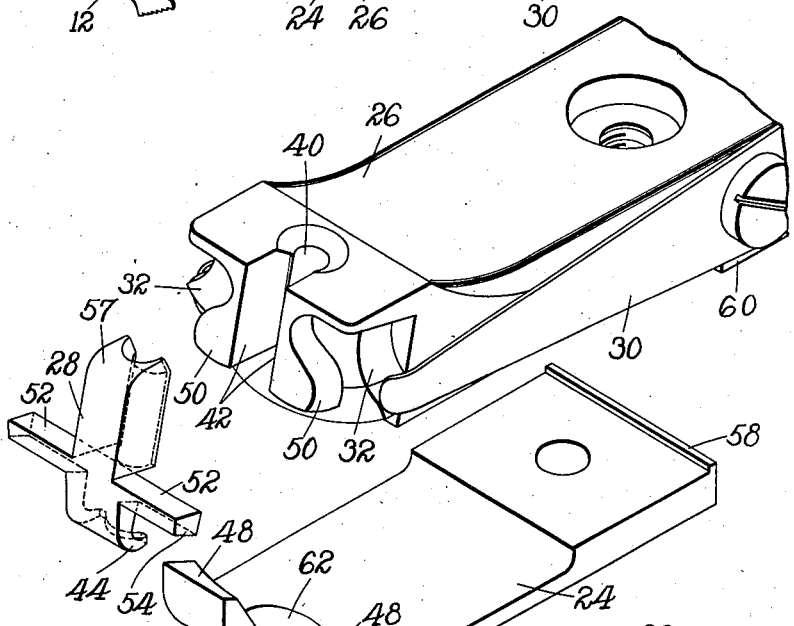
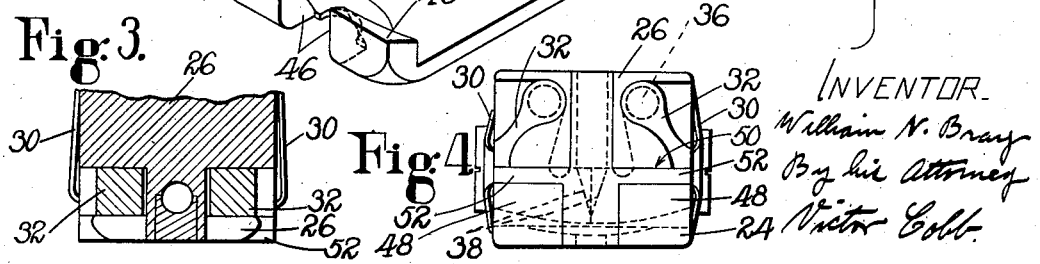

Patented Dec. 19, 1939

2,183,666

UNITED STATES PATENT OFFICE 2,183,666

LASTING MACHINE

William Neil Bray, Leicester, England, assignor to United Shoe Machinery Corporation, Borough of Flemington, N. J., a corporation of New Jersey Application March 7, 1939, Serial No. 260,355
In Great Britain March 30, 1938

10 Claims. (Cl. 12—2)

This invention relates to improvements in machines for working uppers over lasts and particularly to lasting machines of the progressive or step-by-step type such as that disclosed, for example, in Letters Patent of the United States No. 584,744, granted June 15, 1897, upon application of Ladd and McFeely.

Machines of this type have a combined tack block and wiper which reciprocates from a rearward position where it receives a tack to a forward position where it works the upper into overlasted position and the tack is driven by a driver which passes through the tack block and inserts the tack to hold the overlasted upper in position. The driver is secured to a driver bar and, after the tack is driven, the driver bar is lifted and the tack block and wiper returned to its rearward position to receive another tack from a tack separator under which the tack block lies when in its rearward position. The combined tack block and wiper is connected to a slide which moves horizontally, positive reciprocating movements in both directions being imparted thereto by a cam and cam lever.

It sometimes happens that the driver breaks in two, leaving a part of it in the tack block, or that the driver becomes loosened from its connection to the driver bar and remains in the tack block when the driver bar is lifted. In such cases the driver, projecting upwardly from the tack block, is in position to engage the tack-separating mechanism and cause injury either to that or to the mechanism for reciprocating the wiper slide. Moreover, should the operator not notice such an occurrence and continue to operate the machine, the gripper with which machines of this type are provided would be likely to engage the tack block and be injured.

Objects of this invention are to avoid breakage of machine parts under the conditions above enumerated. With these objects in view the invention comprises a tack block having a driver passage part of which is formed in the tack block itself and the remainder formed on a part which is movable forwardly relatively to the tack block against frictional means which can be overcome without injuring the parts. Thus, if the driver or a part thereof remains projecting upwardly from the tack block when the tack block is withdrawn, the driver, upon contact with the tack-separating mechanism, forces the removable side of the driver passage forwardly without doing any damage to the parts and the machine may be restored to operative condition merely by replacing the driver and restoring the removable portion of the tack block to its original position.

In order that the invention may be more fully understood, a particular embodiment thereof will be described with reference to the accompanying drawing and its features pointed out in the appended claims.

In the drawing,

Fig. 1 is a side elevation of the operating instrumentalities of a hand method lasting machine embodying the present invention;

Fig. 2 is an exploded perspective view of a tack block and wiper constructed in accordance with the present invention;

Fig. 3 is a horizontal section through the tack block; and

Fig. 4 is a front elevation of the tack block and wiper.

The illustrated machine is similar to that disclosed in the above-mentioned patent and, as usual, is provided with a gripper 10 for seizing and tensioning the upper, a sole rest 12, a tack raceway 14, a tack separator 16 and a driver bar 18 carrying a driver 20. A wiper slide 22 is reciprocated horizontally to cause a wiper 24 to engage a portion of the upper, which has been tensioned by the gripper 10, and wipe it over the last bottom, whereupon it is secured by a tack fed from the raceway 14 by the separator 16 to a tack block 26 carried by the wiper 24 and driven by descent of the driver bar 18 which forces the driver 20 through an opening in the tack block into the shoe.

In the novel tack block and wiper embodying the present invention the wiper 24, the tack block 26 and a front piece 28 are constructed as illustrated in Fig. 2. The rear portion of the tack block 26 is secured rigidly to the wiper slide 22 and has on its opposite sides springs 30 the forward ends of which bear against tack fingers 32 and hold them yieldingly together. The tack fingers 32 are located in recesses, one at each side of the tack block 26, and have studs 36 journaled in the tack block 26 providing pivots extending longitudinally of the tack block about which beveled lower ends 38 (Fig. 4) of the tack fingers 32 may be turned by the springs 30 to cause the fingers to support a tack deposited by the separator 16 in an opening 40 in the tack block directly over the fingers 38. The opening 40 constitutes a passage for the driver so that the driver engaging a tack resting on the fingers 38 will force it between them and insert it into the work, the tack fingers then turning on their studs 36 against the springs 30 to permit passage of the tack between them. In the front end of the wiper 24 is a vertical slot 42 slightly wider than the diameter of the opening 40 and the front piece 28 is formed to fit the slot 42, its rear face being contoured to constitute a continuation of the cylindrical surface forming the opening 40. The lower part 44 of the end piece 28 is bent rearwardly and formed to fit a notch 46 formed in the front end of the wiper 24. On the front end of the wiper 24 are upward projections 48 which underlie horizontal surfaces 50 on the tack block 26. The front piece 28 has on each side a side bar 52 which, when the front piece is assembled in the slot 42, underlies the surface 50 and overlies the upward projection 48 on the wiper 24.

The upper faces of the side arms 52 are horizontal as are the faces 50 on the tack block which they engage. The lower faces 54 of the side bars 52 are forwardly and upwardly inclined and the top faces of the projections 48 are similarly inclined. The major portion of the wiper 24 is made thin enough so that it will have some resiliency and, when the wiper 24 is secured to the tack block 26 by a bolt 56 (Fig. 1), the cross bars 52 are held yieldingly between the projections 48 on the wiper and the surfaces 50 on the tack block. Thus the end piece 28 is held in place with sufficient security so that the tack block and wiper can perform their usual functions but, if the driver 20 or a portion thereof should remain in the tack block when the driver bar is raised and the slide 22 withdrawn, the projecting driver will engage the separator 16 and cause the end piece 28 to be displaced wholly or partially from the tack block as the tack block recedes without causing any damage to the machine and, after replacement of the driver 20, the end piece 28 may be reinserted in its normal position, thus restoring the machine to operative condition.

The upper end of the end piece 28 is rounded off at 57 to minimize danger of breakage of parts by contact of the gripper 10 therewith if the machine is operated after a broken driver has merely tilted the end piece forwardly without removing it bodily from the tack block, as may sometimes happen.

The rear end of the wiper 24 is provided with a rib 58 which engages the tack block and as the bolt 56 is tightened it tends to spring the wiper 24 and force the projections 48 upwardly firmly to grip the sidebars 52 against the surfaces 50. The rear end of the wiper 34 engages a ledge 60 on the tack block 26 which prevents rotation of the wiper 24 on its bolt 56. The wiper 24 may be recessed at 62 to insure that the tack fingers 32 will not contact with it during their separation to permit passage of the tack.

Having thus described my invention, what I claim as new and desire to secure by Letters Patent of the United States is:

1. In a machine for working uppers over lasts, a tack block and wiper arranged for movement from a rearward position where the tack block receives a tack to a forward position where the wiper wipes the upper over the last bottom, means for supplying tacks to the tack block when in its rearward position, and means for driving a tack when the tack block is in its forward position, the tack block and wiper having a removable end piece which can yield forwardly in case the driver or a part thereof remains projecting from the tack block and hits the separator when the tack block is returned to its rearward position.

2. In a machine for working uppers over lasts, a tack block, a wiper arranged for movement from a rearward position where the tack block receives a tack to a forward position where the wiper wipes the upper over the last bottom, a tack separator for supplying tacks to the tack block when in its rearward position, and a driver for driving a tack when the tack block is in its forward position, the tack block and wiper having a removable end piece which can yield forwardly in case the driver or a part thereof remains projecting from the tack block and hits the separator when the tack block is moved to its rearward position.

3. In a step-by-step lasting machine, a tack block, a wiper secured to the under side of the tack block, open slots in the tack block and wiper forming part of the driver passage, an end piece to enter said slots to complete the driver passage, forwardly and upwardly inclined surfaces on the end piece and on the wiper, means for imparting a yielding quality to the wiper, and means for securing the wiper to the tack block so as to cause the said inclined surfaces to be pressed yieldingly together.

4. In a step-by-step lasting machine, the combination of a tack block, a wiper secured to the under side of the tack block, open slots in the tack block, a yielding wiper forming part of the driver passage, an end piece fitting in said slots, and side bars on the end piece engaging on one side horizontal surfaces on the tack block and on the other side inclined surfaces on the wiper so that the end piece is yieldingly held in operative position between the tack block and wiper.

5. In a step-by-step lasting machine, the combination of a tack block, a wiper secured to the under side of the tack block, open slots in the tack block and wiper forming part of the driver passage, an end piece to enter said slots and complete the driver passage, and means for yieldingly holding the end piece in position.

6. In a step-by-step lasting machine, the combination of a tack block, a wiper secured to the under side of the tack block, open slots in the tack block and wiper forming part of the driver passage, an end piece adapted to enter the slots and complete the driver passage, and side bars on the end piece engaging on one side surfaces on the tack block and on the other surfaces on the wiper so that the bars are yieldingly held in operative position between the tack block and wiper.

7. In a step-by-step lasting machine, the combination of a tack block, a wiper secured to the under side of the tack block, open slots in the tack block and wiper forming part of the driver passage, and side bars on the end piece having upper horizontal surfaces engaging a similar surface on the tack block and having lower inclined surfaces engaging similar surfaces on the wiper, the wiper being resilient to permit disengagement of said surfaces if movement of the end piece with the tack block and wiper is obstructed.

8. A tack block for fastening-inserting machines having a driver passage therethrough, yielding means for retaining tacks in the tack block, an end piece for the tack block in which part of the driver passage is formed, and means for yieldingly holding the end piece in the tack block.

9. A tack block for fastening-inserting machines having a driver passage therethrough, yielding tack fingers for retaining tacks in the tack block, an end piece for the tack block in which part of the driver passage is formed, side bars on the end piece, and means for yieldingly clamping the side bars.

10. A tack block for fastening-inserting machines having a driver passage therethrough, tack fingers for retaining tacks in the passage, an end piece for the tack block in which part of the driver passage is formed, side bars on the end piece, and means engaging upper and lower surfaces of the side bars to hold the end piece removably in position.

WILLIAM NEIL BRAY.